United States Patent Office 3,432,504
Patented Mar. 11, 1969

3,432,504
SALTS OF FURAN CARBOXYLIC ACIDS WITH THIAMINE AND ITS SALTS
Wolfgang Goetze-Claren, New York, N.Y.
(Via Mangili 30, Rome, Italy)
No Drawing. Filed June 28, 1966, Ser. No. 561,065
U.S. Cl. 260—256.6         9 Claims
Int. Cl. C07d 99/12; A61k 15/12

ABSTRACT OF THE DISCLOSURE

There are disclosed the salts of thiamine, its salts, its O-phosphorus acid esters, and their salts with 2-furan carboxylic acid and 2,5-furan dicarboxylic acid. Also are disclosed pharmaceutical compositions and methods of using these compounds in treating vitamin $B_1$ deficiencies.

---

The present invention relates to salts and derivatives of furan carboxylic acids and more particularly to salts and derivatives of furan carboxylic acids with thiamine and its salts and derivatives, and to a process of making and using such salts and derivatives.

The water-soluble vitamin $B_1$ (thiamine) is widely distributed in natural foodstuffs. However, it is lost to a large extent on cooking food whereby it is discarded in the water used for boiling. It is also lost on milling wheat. It is present in whole-grain, legumes, beef, pork, liver, nuts and yeast as well as in eggs, fish, and other vegetable food material. The daily intake, however, is usually too small so that most business and city people suffer a marked vitamin B deficiency chronically.

It is an object of the present invention to provide new and valuable salts of thiamine and its derivatives which have an increased and prolonged vitamin $B_1$ activity.

Another object of the present invention is to provide a new and valuable thiamine ester of improved therapeutic activity.

A further object of the present invention is to provide a new and valuable thiamine phosphoric acid ester compound of improved therapeutic activity.

A further object of the present invention is to provide a simple and effective process of making such new and valuable thiamine salts and compounds.

Still another object of the present invention is to provide a pharmaceutical composition containing the aforesaid thiamine salts and derivatives.

Another object of the present invention is to provide a method of using such compositions in therapy.

Other objects of the present invention and advantageous features thereof will become apparent as the description proceeds.

In principle the present invention relates to new and valuable thiamine compounds with furan carboxylic acids. Such compounds correspond to Formula I:

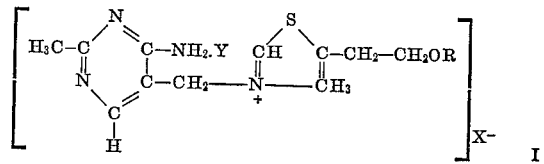

In said formula:

X is the anion of 2-furan carboxylic acid, 2,5-furan dicarboxylic acid, or a pharmaceutically acceptable inorganic or organic acid such as hydrochloric acid, citric acid, phosphoric acid, naphthalene-1,5-disulfonic acid, and others;

Y is 2-furan carboxylic acid, 2,5-furan dicarboxylic acid, or a pharmaceutically acceptable inorganic or organic acid such as hydrochloric acid, phosphoric acid, and others; and R is hydrogen or an ester-forming phosphoric acid or triphosphoric acid residue of the formula $-PO_3H_2$ or $-PO_3H-PO_3H-PO_3H_2$ or $-PO_3H-PO_3H_2$, whereby, at least one of said members X and Y, is derived from 2-furan carboxylic acid or 2,5-furan dicarboxylic acid.

Thiamine compounds as they are provided according to the present invention thus correspond to the following formulas:

(a) The thiamine compound with 2-furan carboxylic acid

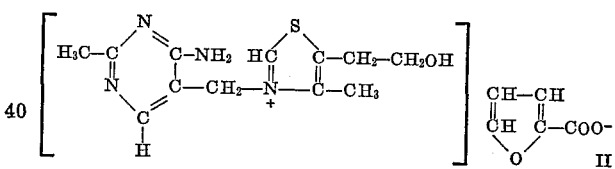

and its amine salt with 2-furan carboxylic acid or other acids.

(b) The thiamine compound with 2,5-furan dicarboxylic acid

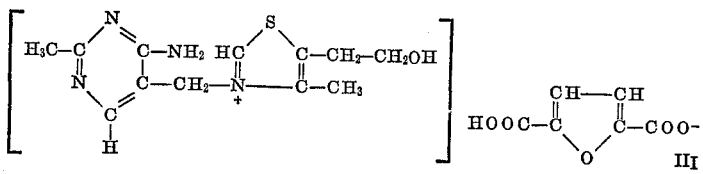

(c) The salts of thiamine phosphoric acid esters or thiamine triphosphoric acid ester with 2-furan carboxylic acid or 2,5-furan carboxylic acid

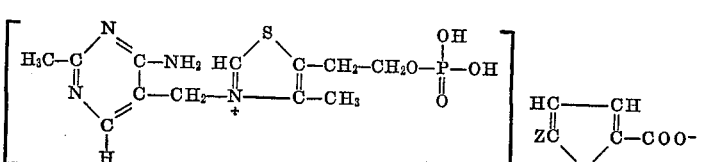

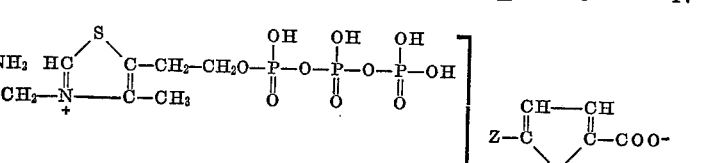

wherein Z is hydrogen or the carboxyl group.

The compounds of Formulas II and III are prepared, for instance, by removing all chloride ions from thiamine chloride hydrochloride by treatment with alkali and reacting the resulting free thiamine base with a stoichiometric amount of 2-furan carboxlic acid or 2,5-furan dicarboxylic acid.

The compounds of Formulas IV and V are produced, for instance, from the thiamine phosphoric acid ester chloride hydrochlorides by ion exchange.

The new compounds and especially the salts of Formulas II and III have proved a value as appearing tonic to overcome loss in appetite, low gastric acid, atony of the stomach and intestines, constipation, and the tendency towards colitis. They are also useful to ameliorate the symptoms of cardio-vascular disturbances in all cases of myocardial infraction and are helpful in degenerative diseases, neurodermatitis, diphtheria, neuritis, and other diseases. They are, of course, also used in the treatment of vitamin $B_1$ deficiency.

The new thiamine salts and compounds can be added to food, for instance, for enriching flour mixes. They can also be employed as addition to animal feed.

The following examples serve to illustrate the present invention without, however, limiting the same thereto.

Example 1

33.7 g. of thiamine chloride hydrochloride are dissolved in 200 cc. of water and 8 g. of sodium hydroxide are added thereto to produce a solution of the free base. Addition of 11.2 g. of 2-furan carboxylic acid in 400 cc. of water yields a precipitate of the 2-furan carboxylic acid salt of thiamine which is filtered off by suction. It is also possible to dilute the reaction mixture with water to yield 1340 cc. of a physiological salt solution of the 2-furan carboxylic acid salt of thiamine which contains about 2.8 g. of said salt per 100 cc. of solution. This solution can be used for injection treatment.

Example 2

The procedure is the same as described hereinabove whereby 15.6 g. of 2,5-furan dicarboxylic acid are used in place of the 2-furan carboxylic acid.

Example 3

The 2-furan carboxylic acid salt of thiamine phosphoric acid ester is obtained by reacting thiamine phosphoric acid ester chloride hydrochloride as described above.

Example 4

The 2-furan carboxylic acid salt of thiamine triphosphoric acid is obtained by reacting thiamine triphosphoric acid ester with 2-furan carboxylic acid.

Example 5

The 2-furan carboxylic acid salt of thiamine phosphoric acid ester chloride is obtained by adding to the thiamine phosphoric acid ester chloride the equimolecular amount of 2-furan carboxylic acid and isolating the resulting salt from the reaction mixture.

Example 6

The 2,5-furan dicarboxylic acid salt of thiamine phosphoric acid ester chloride is obtained by adding to the thiamine phosphoric acid ester chloride the equimolecular amount of 2,5-furan dicarboxylic acid and isolating the resulting salt from the reaction mixture.

Example 7

The 2-furan carboxylic acid salt of cocarboxylase, i.e. thiamine pyrophosphoric acid ester of Formula VI is obtained by proceeding as described in Example 1.

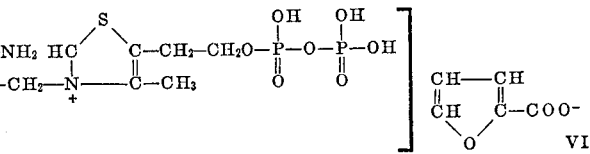

Example 8

The 2,5-furan dicarboxylic acid salt of cocarboxylase, i.e. thiamine pyrophosphoric acid ester is obtained in a similar manner is described in Example 2 by using 2,5-furan dicarboxylic acid as the one reactant.

Example 9

The 2-furan carboxylic acid salt of thiamine triphosphoric acid ester of Formula VII

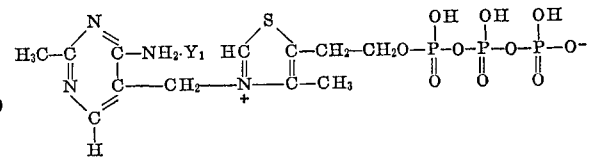

wherein $Y_1$ is 2-furan carboxylic acid obtained by adding the stoichiometric amount of 2-furan carboxylic acid to an aqueous solution of thiamine triphosphoric acid ester.

The free amino group in the pyrimidine moiety of the new salts may also be converted into the acid addition salt group whereby either a pharmaceutically acceptable inorganic or organic acid or an additional mole of 2-furan carboxylic acid may be used for salt formation.

The new furan carboxylic acid salts of thiamine and its phosphoric acid esters can be administered orally and parenterally. Compositions containing said salts as used in therapy comprise, for instance, tablets, pills, dragees, lozenges, and the like shaped preparations to be administered orally. The salts may also be administered in powder form, preferably inclosed in gelatin or the like capsules. Oral administration in liquid form, such as in the form of solutions, emulsions, suspensions, sirups, and the like is also possible. Such solid and liquid preparations are produced in a manner known to the art of compounding and processing pharmaceutical products whereby the conventional diluting, binding, and/or expanding agents, lubricants, and/or other excipients, such as lactose, cane sugar, dextrins, starch, talc, kaolin, magnesium hydroxide, magnesium carbonate, pectin, gelatin, agar, bentonite, stearic acid, magnesium stearate, and others may be employed.

Of course, many changes and variations in the reactants, the reaction conditions, temperature, duration, in the solvents used, in the methods of isolating and purifying the reaction products, in the preparation of pharmaceutical compositions, in their use in therapy, and the like may be made by those skilled in the art in accordance with the principles set forth herein and in the claims annexed hereto.

I claim:
1. A thiamine compound of the formula

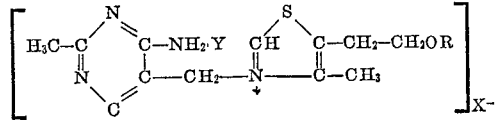

wherein
X is an anion selected from the group consisting of 2-furan carboxylic acid, 2,5-furan dicarboxylic acid, and a pharmaceutically acceptable inorganic and organic acid;
Y is an acid selected from the group consisting of 2-furan carboxylic acid, 2,5-furan dicarboxylic acid, and a pharmaceutically acceptable inorganic and organic acid;
R is a member selected from the group consisting of hydrogen and an ester-forming phosphoric acid, pyrophosphoric acid, and triphosphoric acid radical, whereby at least one of said members X and Y is derived from said furan carboxylic acids and whereby X is derived from said furan carboxylic acids while —NH$_2$.Y is a free amino group.

2. The thiamine compound according to claim 1, wherein
R is hydrogen,
—NH$_2$.Y is the free amino group, and
X$^-$ is the 2-furan carboxylic acid anion.

3. The thiamine compound according to claim 1, wherein
R is hydrogen,
—NH$_2$.Y is the free amino group, and
X$^-$ is the 2,5-furan dicarboxylic acid anion.

4. The thiamine compound according to claim 1, wherein
R is the phosphoric acid radical of the formula

—NH$_2$.Y is the free amino group, and
X$^-$ is the 2-furan carboxylic acid anion.

5. The thiamine compound according to claim 1, wherein
R is the phosphoric acid radical of the formula

—NH$_2$.Y is the free amino group, and
X$^-$ is the 2,5-furan dicarboxylic acid anion.

6. The thiamine compound according to claim 1, wherein
R is the triphosphoric acid radical of the formula

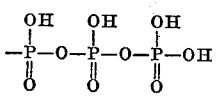

—NH$_2$.Y is the free amino group, and
X$^-$ is the 2-furan carboxylic acid anion.

7. The thiamine compound according to claim 1, wherein
R is the triphosphoric acid radical of the formula

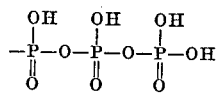

—NH$_2$.Y is the free amino group, and
X$^-$ is the 2,5-furan dicarboxylic acid anion.

8. The thiamine compound according to claim 1, wherein
R is the pyrophosphoric acid radical of the formula

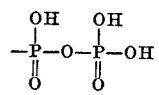

—NH$_2$.Y is the free amino group, and
X$^-$ is the 2-furan carboxylic acid anion.

9. The thiamine compound according to claim 1, wherein
R is the pyrophosphoric acid radical of the formula

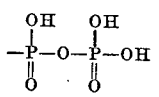

—NH$_2$.Y is the free amino group, and
X$^-$ is the 2,5-furan dicarboxylic acid anion.

References Cited

FOREIGN PATENTS 653,060 11/1962 Canada.
881,688 2/1943 France.
1,208,305 1/1966 Germany.

OTHER REFERENCES

Okumura et al., J. Vitaminology, vol. 2 (1950), pp. 276–82.

ALEX MAZEL, *Primary Examiner.*

R. J. GALLAGHER, *Assistant Examiner.*

U.S. Cl. XR
424—255